United States Patent [19]
Jäger

[11] 3,982,699
[45] Sept. 28, 1976

[54] METHOD AND PLANT FOR PRODUCING CEMENT OR OTHER MATERIAL OF GIVEN FINENESS AND GRANULAR STRUCTURE

[76] Inventor: Heinz Jäger, Nevelstr. 40, Bochum, Germany, 4630

[22] Filed: Dec. 23, 1974

[21] Appl. No.: 535,690

[30] Foreign Application Priority Data
Dec. 22, 1973 Germany............................ 2364277

[52] U.S. Cl................................. 241/14; 241/24; 241/29; 241/76; 241/80
[51] Int. Cl.² ........................................ B02C 23/12
[58] Field of Search ................... 241/19, 24, 29, 76, 241/78, 79, 80

[56] References Cited
UNITED STATES PATENTS

| | | | |
|---|---|---|---|
| 1,748,920 | 2/1930 | Newhouse............................ | 241/19 |
| 1,784,462 | 12/1930 | Miller et al. ........................... | 241/19 |
| 1,902,413 | 3/1933 | Miller .................................... | 241/19 |
| 1,943,817 | 1/1934 | Dunton ............................. | 241/24 X |
| 3,323,727 | 6/1967 | Heilman................................ | 241/19 |
| 3,586,248 | 6/1971 | Ruegg................................... | 241/19 |
| 3,712,549 | 1/1973 | Cleemann.......................... | 241/24 X |

*Primary Examiner*—Granville Y. Custer, Jr.
*Attorney, Agent, or Firm*—Herbert L. Lerner

[57] ABSTRACT

Method of producing cement or other material of given fineness and granular structure includes delivering material ground in individual chambers of a tube mill having two adjacent grinding chambers, delivering the ground material from each of the chambers to coarse-grain separator means associated with the chambers, separating a fines-free coarse-grain component in the coarse-grain separator means and returning the coarse-grain component to one of the adjacent chambers, feeding the fines component of the coarse-grain separator means to a fine-grain separator, separating a fine-grain component from a coarse-grain component in the fine-grain separator, withdrawing the fine-grain component from the fine-grain separator as end product, and returning the coarse-grain component of the fine-grain separator to the coarse-grain separator means; and plant for carrying out the foregoing method.

8 Claims, 4 Drawing Figures

METHOD AND PLANT FOR PRODUCING CEMENT OR OTHER MATERIAL OF GIVEN FINENESS AND GRANULAR STRUCTURE

The invention relates to a method and plant for producing cement or other material of given fineness and desired granular structure and, more particularly, through grinding and separating from cement or other clinker.

In order to obtain a cement, for example, that has maximum stability or strength, a specific range of granular structure is sought after which, if possible, should neither be exceeded nor fallen short of. In this regard, care must be taken that the course run by the grinding and separating processes is economical i.e. the power demand of the plant carrying out those processes is kept as low as possible.

It is accordingly an object of the invention to provide a method and plant for producing cement or other material of given fineness and grain structure in which grinding and separating is effected with economical power consumption.

With the foregoing and other objects in view there is provided, in accordance with the invention, a method of producing cement or other material of given fineness and granular structure which comprises delivering material ground in individual chambers of a tube mill having two adjacent grinding chambers, delivering the ground material from each of the chambers to coarse-grain separator means associated with the chambers, separating a fines-free coarse-grain component in the coarse-grain separator means and returning the coarse-grain component to one of the adjacent chambers, feeding the fines component of the coarse-grain separator means to a fine-grain separator, separating a fine-grain component from a coarse-grain component in the fine-grain component from the fine-grain separator as end product, and returning the coarse-grain component of the fine-grain separator to the coarse-grain separator.

In accordance with another mode of the method of the invention, wherein the tube mill has at least two adjacent grinding chambers, and the coarse-grain separator means comprises a coarse-grain separator for each of the grinding chambers, the method comprises delivering the ground material from each of the chambers to the respective coarse-grain separator, returning the fines-free coarse-grain component separated in the respective coarse-grain separator to the chamber associated therewith feeding the fines component of the respective coarse-grain separator to the coarse-grain separator associated with a succeeding chamber of the tube mill, feeding the fine-grain component separated in the last of the coarse-grain separators to the fine-grain separator, and returning the coarse-grain component separated in the fine grain separator to the coarse-grain separator immediately preceding the fine-grain separator.

In accordance with a further mode of the method of the invention, at least part of the coarse-grain component separated in the fine-grain separator is returned to the last grinding chamber of the tube mill. Due to the fact that the concentration of fine-grain material is thereby enriched, the grain structure of the end product withdrawn from the fine-grain separator is affected thereby.

In accordance with an added mode of the method of the invention, at least part of the coarse-grain component separated in the coarse-grain separator means and in the fine-grain separator is passed through a fine-grain mill such as a vibrating mill for example, before it is delivered to the separation circuit of the last of the grinding chambers of the tube mill.

In accordance with the plant of the invention for carrying out the method thereof, there are provided a tube mill having two grinding chambers with respective ground material discharge outlets, coarse-grain separator means, bucket conveyor means for conveying the ground material discharged from the outlets of each of the grinding chambers to the coarse-grain separator means, and a fine-grain separator after-connected to the coarse-grain separator means.

In accordance with an alternate embodiment of the plant of the invention, there are provided a tube mill having at least two grinding chambers with respective ground material discharge outlets, a respective coarse-grain separator associated with each of the grinding chambers, a respective bucket conveyor between each of the chambers and the respective coarse-grain separator for conveying ground material discharged from the outlet of each of the grinding chambers to the respective coarse-grain separator, means for delivering fine-grain component separated in the respective coarse-grain separators from next preceding to next succeeding coarse-grain separators, and a fine-grain separator after-connected to the last of the coarse-grain separators.

Other features which are considered as characteristic for the invention are set forth in the appended claims.

Although the invention is illustrated and described herein as embodied in method and plant for producing cement or other material of given fineness and granular structure, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings or "the singe feature", in which.

Figure 1:
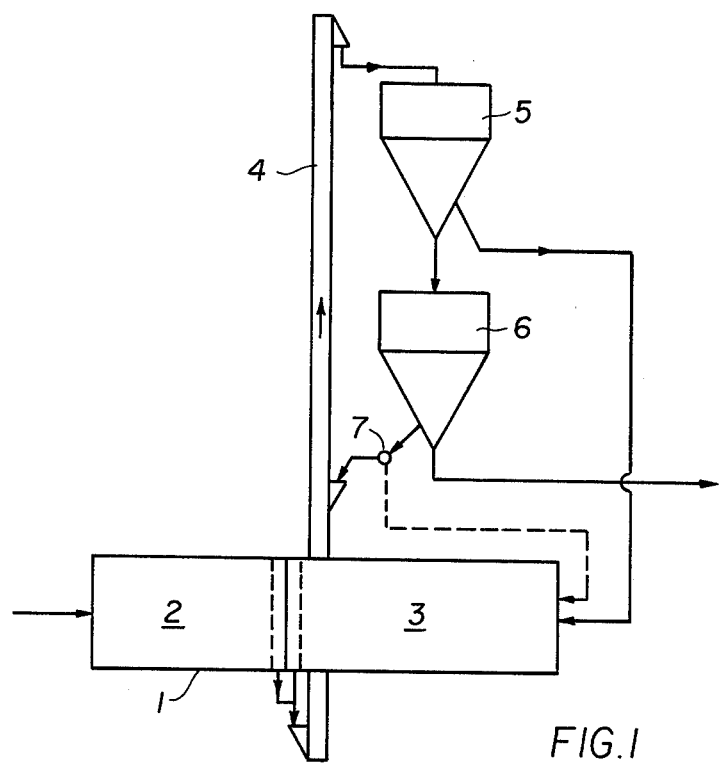
FIG. 1 is a diagrammatic view of one embodiment of a milling or grinding plant according to the invention having a double-chamber tube mill a coarse-grain separator and a fine-grain separator.

Referring now to the drawing and first, particularly, to FIG. 1 thereof, there is shown a milling or grinding plant according to the invention, which is formed of a tube mill 1 that is divided into two chambers 2 and 3, each of which has a discharge represented by the downwardly directed arrows at the mutually adjacent respective ends thereof. The ground material discharged from the chamber 2, together with the ground material discharged from the chamber 3, is delivered by a bucket conveyor or elevator 4 to a coarse-grain separator 5. Separation of the separator feed material, for example, at 0.09 mm, occurs in the coarse-grain separator 5, the coarse-grain material running back into the chamber 3 from the separator 5 containing no fines component smaller than 0.09 mm. The fine-grain material is delivered from the coarse-grain separator 5 to the fine-grain separator 6. Separation of the final product occurs in the fine-grain separator 6, the coarser grain material being re-delivered from the separator 6 through the bucket conveyor 4 to the coarse-grain separator 5. If necessary, part of the coarser grain material of the fine-grain separator 6 can be fed to the chamber 3 with the aid of a conventional shifting or reversing flap 7. Merely as exemplary, fine-grain separator 6 separates the granular material into an end product which contains a mixture of grains of 0.09 mm and smaller. The coarser material discharging from fine grain separator 6 is also a mixture of granular material with a small amount of grain particles starting at a size below 0.09 mm, say about 0.07 mm, and up to a size of about 0.14 mm with the major portion having a size in the range of about 0.10 – 0.12 mm.

Figure 2:
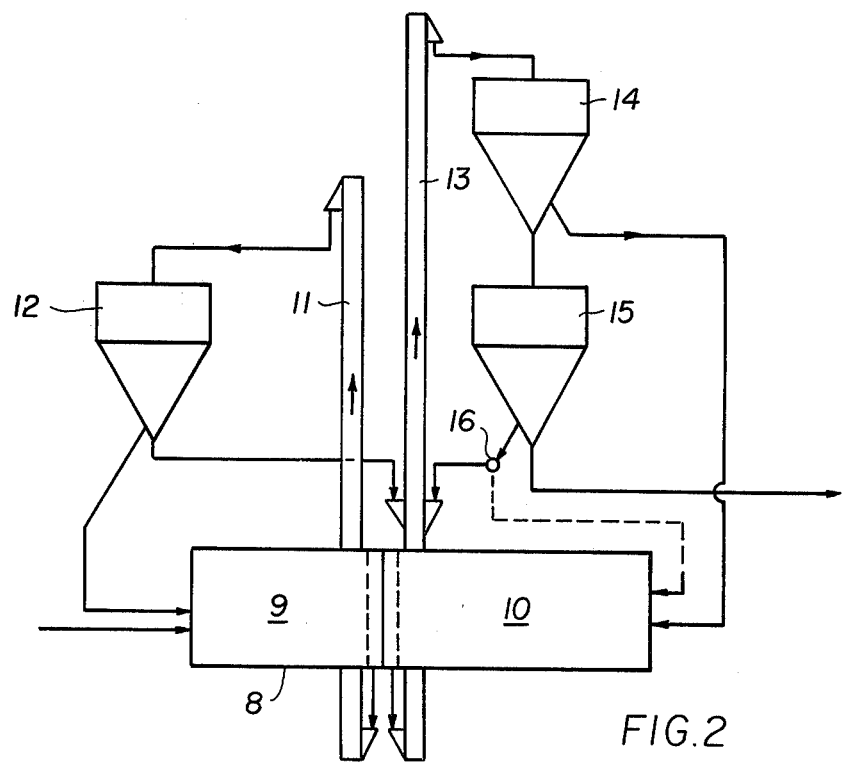
FIG. 2 is a view similar to that of FIG. 1 of another embodiment the milling or grinding plant having a double-chamber tube mill with a respective coarse grain separator for each chamber, and a fine-grain separator.

The grinding or milling plant according to FIG. 2 is made up of a tube mill 8 that is subdivided into two chambers 9 and 10. The ground material discharging from the chamber 9 is fed by bucket conveyor or elevator 11 to a coarse-grain separator 12. Separation at, for example, 0.09 mm, occurs in the coarse grain separator 12, the coarser-grain material running back into the chamber 9 from the separator 12 containing no fines component smaller than 0.09 mm. The fine-grain material from the separator 12 and ground material from the chamber 10 of the tube mill 8 are conveyed by a bucket conveyor 13 to a coarse-grain separator 14. Separation at, for example, 0.03 occurs in the coarse-grain separator 14, the coarser grain material of the separator 14 returned to the chamber 10 containing no fines component smaller than 0.03 mm. The separated fine-grain material of the separator 14 is delivered to a fine-grain separator 15 which separates out the desired final product. Merely as exemplary, fine-grain separator 15 separates the granular material into an end product which contains a mixture of 0.03 mm and smaller. The coarser material discharging from fine-grain separator 15 is also a mixture of granular material with a small amount of grain particles starting at a size below 0.03 mm, say about 0.02 mm, and up to a size of about 0.07 mm with the major portion having a size in the range of about 0.04 – 0.06 mm. The coarser material of the separator 15 is re-fed through the bucket conveyor 13 to the coarse-grain separator 14. By means of a shifting or reversing flap 16, part of the coarse material of the fine-grain separator 15 is surrendered to the second chamber 10.

Figure 3:
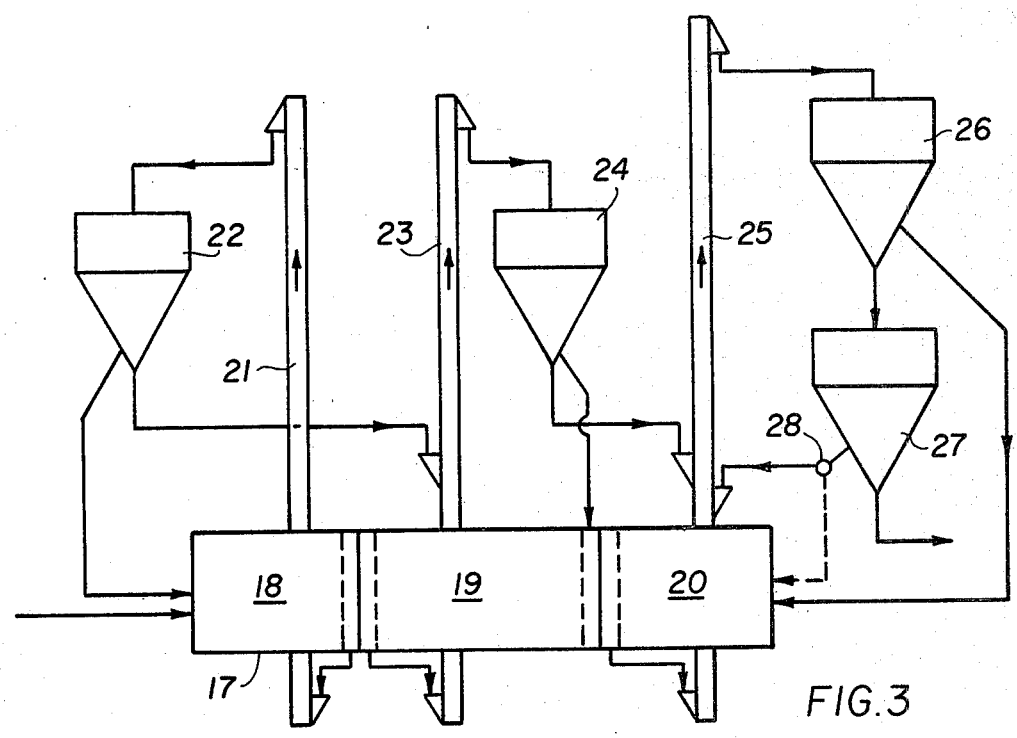
FIG. 3 is a view similar to each of those of FIGS. 1 and 2 of a third embodiment of the milling or grinding plant having a triple-chamber tube mill with a respective coarse-grain separator for each chamber, and a fine-grain separator for discharge of a final product.

The milling or grinding plant according to FIG. 3 is formed of a tube mill 17 that is subdivided into three chambers 18, 29 and 20. The ground material coming out of the chamber 18 is fed through a bucket conveyor or elevator 21 to a coarse-grain separator 22. Separation at, for example, 0.2 mm, takes place in the separator 22, the coarser grain material of the separator 22 running back into the chamber 18 containing no fines component small than 0.2 mm. The fine-grain material of the separator 22 and the ground material from the chamber 19 are conducted by a bucket conveyor or elevator 23 to a coarse-grain separator 24. Separation at, for example, 0.06 mm occurs in the separator 24, the coarser grain material fed back to the chamber 19 containing no fines component smaller than 0.06 mm. The fine-grain material from the coarse-grain separator 24, together with the ground material of the chamber 20 travel by a bucket conveyor or elevator 25 to a coarse-grain separation 26. Separation at, for example, 0.02 mm takes place in the separation 26, the coarser grain material of the separator 26 that flows back to the chamber 20 containing no fines component smaller than 0.02 mm. The fine-grain material separated out in the coarse-grain separator 26 is delivered to a fine-grain separator 27 in which the desired final product is separated out. Merely as exemplary, fine-grain separator 27 separates the granular material into an end product which contains a mixture of grains of 0.02 mm and smaller. The coarser material discharging from fine-grain separator 27 is also a mixture of granular material with a small amount of grain particles starting at a size below 0.02 mm, say about 0.01 mm, and up to a size of about 0.05 mm with the major portion having a size in the range of about 0.03 – 0.04 mm. The coarser grain material of the fine-grain separator 27 runs to the bucket conveyor 25. By means of a shifting or reversing flap 28 part of the coarser grain material of the fine-grain separator 27 can be delivered to the chamber 20.

Figure 4:
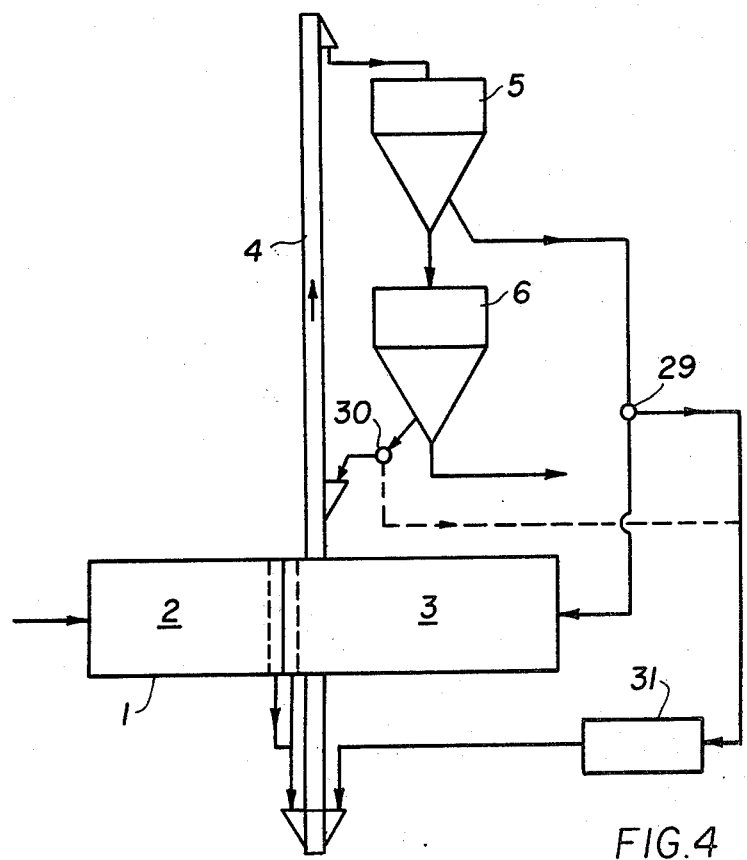
FIG. 4 is a view of the embodiment of FIG. 1 modified to include an additional fine-grain mill.

The milling or grinding plant according to FIG. 4 is similar to that of FIG. 1 in that discharges from chambers 2 and 3 of a tube mill 1 are delivered by means of a bucket conveyor or elevator 4 to a coarse-grain separator 5. The coarse component of the separator 5 is returned to the chamber 3, however, part thereof can be diverted by a conventional flap 29 to a fine-grain mill 31. The fine-grain material of the separator 5 runs to a fine-grain separator 6, the fine-grain material of which is drawn off as end product. The coarse particles of the fine-grain separation 6 flow back into the bucket conveyor 4 or through a flap 30 also to the fine-grain mill 31. The discharge from the fine-grain mill 31 is delivered to the bucket conveyor 4 if a fine-grain enrichment or concentration in the end product is desired.

Besides the use of the aforedescribed method and plant for producing cement of given fineness and granular structure, they are, of course, equally suited for use in producing other materials that are subject to similar conditions, such as minerals or synthetic materials, for example.

I claim:

1. Method of producing cement or other material of given fineness and granular structure which comprises delivering material to be reduced into a first individual chamber of a tube mill having two adjacent grinding chambers, said chambers having no direct connection with each other, delivering the ground material from each of the chambers to coarse-grain separator means associated with the chambers, separating a fines-free coarse-grain component in the coarse-grain separator means and returning the coarse-grain component to one of the adjacent chambers, feeding the fines component of the coarse-grain separator means to a fine-grain separator, separating a fine-grain component from a coarse-grain component in the fine-grain separator, withdrawing the fine-grain component from the fine-grain separator as end product, and returning the coarse-grain component of the fine-grain separator to the coarse separator means.

2. Method according to claim 1 which comprises returning at least part of the coarse-grain component separated in the fine-grain separator to said grinding chamber other than said first chamber in which said material to be reduced is delivered.

3. Method according to claim 1 which comprises passing at least part of the coarse-grain component separated in the coarse-grain separator means and in the fine-grain separator through a fine-grain mill prior to being returned to said coarse-grain separator.

4. Method according to claim 1 wherein all of said fines-free coarse-grain component is directed to said grinding chamber other than said first chamber in which said material to be reduced is delivered.

5. Method according to claim 1 wherein said fines component of said coarse-grain separator means is fed to another coarse-grain separator disposed adjacent said coarse-grain separator means for separation and return for grinding in another chamber of said tube mill of a coarse-grain component and feeding the fines component of said adjacent coarse-grain separator to another fine-grain separator, separating a fine-grain component from a coarse-grain component in said latter fine-grain separator, withdrawing said latter fine-grain component as end product, and returning said latter coarse-grain component to said adjacent coarse-grain separator.

6. Method of producing cement or material of given fineness and granular structure which comprises delivering material to be reduced into a first individual chamber of a tube mill having at least two adjacent grinding chambers, said chambers having no direct connection with each other, delivering the ground material from each of the chambers to respective coarse-grain separator means associated with said chambers, separating a fines free coarse-grain component in said coarse-grain separator means and returning the coarse-grain component separated in the respective coarse-grain separator means to the chamber associated therewith, feeding the fines component of the respective coarse-grain separator means to the coarse-grain separator associated with a succeeding chamber of the tube mill, feeding the fine-grain component separated in the last of the coarse-grain separators to a fine-grain separator, and returning the coarse-grain component separated in the fine-grain separator to the coarse-grain separator immediately preceding the fine-grain separator.

7. Apparatus for producing cement or other material of given fineness and granular structure comprising a tube mill having two grinding chambers with no direct connection with each other, inlet means in a first grinding chamber of said tube mill for introduction of material to be reduced, respective ground material discharge outlets for said grinding chambers, coarse-grain separator means, bucket conveyor means for conveying the ground material discharged from the outlets of each of said grinding chambers to said coarse-grain separator means, means for returning a fines-free coarse-grain component from said separator means to one of said chambers, a fine-grain separator after-connected to said coarse-grain separator means, means for withdrawing a fine-grain component from said fine-grain separator, means for withdrawing a coarse-grain component from said fine-grain separator, and means for returning said latter coarse-grain component to said coarse-grain separator means.

8. Apparatus for producing cement or other material of given fineness and granular structure comprising a tube mill having at least two grinding chambers with no direct connection with each other, inlet means in a first grinding chamber of said tube mill for introduction of material to be reduced, respective ground material discharge outlets for said grinding chambers, a respective coarse-grain separator associated with each of said grinding chambers, a respective bucket conveyor between each of said chambers and the respective coarse-grain separator for conveying ground material discharged from the outlet of each of said grinding chambers to the respective coarse-grain separator, means for delivering a fine-grain component separated in the respective coarse-grain separators from next preceding to next succeeding coarse-grain separators, and a fine-grain separator after connected to the last of said coarse-grain separators.

* * * * *